(12) United States Patent
Tomono et al.

(10) Patent No.: US 10,356,258 B2
(45) Date of Patent: Jul. 16, 2019

(54) IMAGE PROCESSING SYSTEM PERFORMING SCREEN DATA SELECTION, IMAGE PROCESSING DEVICE, TERMINAL DEVICE AND NON-TRANSITORY READABLE RECORDING MEDIUM

(71) Applicant: Konica Minolta, Inc., Chiyoda-ku, Tokyo (JP)

(72) Inventors: Kazuaki Tomono, Okazaki (JP); Hiroki Tajima, Toyokawa (JP); Taiju Inagaki, Toyokawa (JP); Tadashi Suzue, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/003,943

(22) Filed: Jan. 22, 2016

(65) Prior Publication Data

US 2016/0219170 A1 Jul. 28, 2016

(30) Foreign Application Priority Data

Jan. 22, 2015 (JP) ................................. 2015-009998

(51) Int. Cl.
*G09G 5/30* (2006.01)
*G09G 5/391* (2006.01)
*H04N 1/00* (2006.01)

(52) U.S. Cl.
CPC ..... *H04N 1/00469* (2013.01); *H04N 1/00204* (2013.01); *H04N 1/00307* (2013.01);
(Continued)

(58) Field of Classification Search
USPC ................................................. 358/1.1–3.29
See application file for complete search history.

(56) References Cited

U.S. PATENT DOCUMENTS

2004/0221230 A1* 11/2004 Kakemura ............ G06F 3/1462
715/273
2005/0223335 A1* 10/2005 Ichikawa .............. G06F 3/0481
715/801
(Continued)

FOREIGN PATENT DOCUMENTS

JP 2002-342198 A 11/2002
JP 2004-310185 A 11/2004
(Continued)

OTHER PUBLICATIONS

Office Action dated Feb. 14, 2017 issued by the Japanese Patent Office in corresponding Japanese Patent Application No. 2015-009998 and English language translation. (11 pages).
(Continued)

*Primary Examiner* — Marcellus J Augustin
(74) *Attorney, Agent, or Firm* — Buchanan Ingersoll & Rooney PC

(57) ABSTRACT

An image processing system comprises: a terminal device that is provided with a display part; and an image processing device that outputs screen data to the terminal device, thereby enabling the display part to display a screen based on the screen data. The image processing device includes: a storage part in which multiple types of the screen data corresponding to respective screen sizes are stored; a screen information obtaining part that obtains information relating to the screen size of the display part; a screen data selecting part that selects the screen data corresponding to the screen size smaller than the screen size of the display part from among the multiple types of the screen data based on the information obtained by the screen information obtaining part; and an output part that outputs the screen data selected by the screen data selecting part to the terminal device.

9 Claims, 14 Drawing Sheets

(52) U.S. Cl.
CPC ..... *H04N 1/00411* (2013.01); *H04N 1/00413* (2013.01); *H04N 1/00416* (2013.01); *H04N 2201/0065* (2013.01); *H04N 2201/0094* (2013.01)

(56) References Cited

U.S. PATENT DOCUMENTS

| | | | | |
|---|---|---|---|---|
| 2005/0257155 | A1* | 11/2005 | Cohen | G06F 17/30899 715/745 |
| 2006/0253453 | A1* | 11/2006 | Chmaytelli | G06F 17/30867 |
| 2010/0033748 | A1* | 2/2010 | Enami | G09G 5/391 358/1.13 |
| 2012/0182432 | A1* | 7/2012 | Okamoto | G06F 3/1204 348/207.1 |
| 2013/0018939 | A1* | 1/2013 | Chawla | H04L 67/08 709/203 |
| 2013/0100497 | A1* | 4/2013 | Amiya | G06F 3/1454 358/1.15 |
| 2014/0373051 | A1* | 12/2014 | Park | H04N 21/4131 725/34 |
| 2015/0378524 | A1* | 12/2015 | Wilde | G06F 3/0488 715/779 |

FOREIGN PATENT DOCUMENTS

| | | |
|---|---|---|
| JP | 2007-086213 A | 4/2007 |
| JP | 2007-166259 A | 6/2007 |
| JP | 2009-141705 A | 6/2009 |
| JP | 2012-147387 A | 8/2012 |
| JP | 2012-243109 A | 12/2012 |
| JP | 2013-251646 A | 12/2013 |
| JP | 2014-35555 A | 2/2014 |
| JP | 2014-222481 A | 11/2014 |
| WO | 2010/079649 A1 | 7/2010 |

OTHER PUBLICATIONS

Office Action (Second Notice of the Opinion on Examination) dated Feb. 2, 2019, by the Chinese Patent Office in corresponding Chinese Patent Application No. 201610040494.5, and an English Translation of the Office Action. (31 pages).

Office Action (First Notice of the Opinion on Examination) dated May 3, 2018, by the Chinese Patent Office in corresponding Chinese Patent Application No. 201610040494.5, and an English Translation of the Office Action. (30 pages).

* cited by examiner

IMAGE PROCESSING SYSTEM 1

FIG. 3

SCREEN DATA 21

| | SCREEN DATA FOR 7 INCH | SCREEN DATA FOR 9 INCH | SCREEN DATA FOR 15 INCH | SCREEN DATA FOR 15 INCH |
|---|---|---|---|---|
| | 21a | 21b | 21c | 21d |
| RESOLUTION | W V G A (800 × 480) | W V G A (800 × 480) | W V G A (800 × 480) | W X G A (1280 × 768) |

FIG. 7
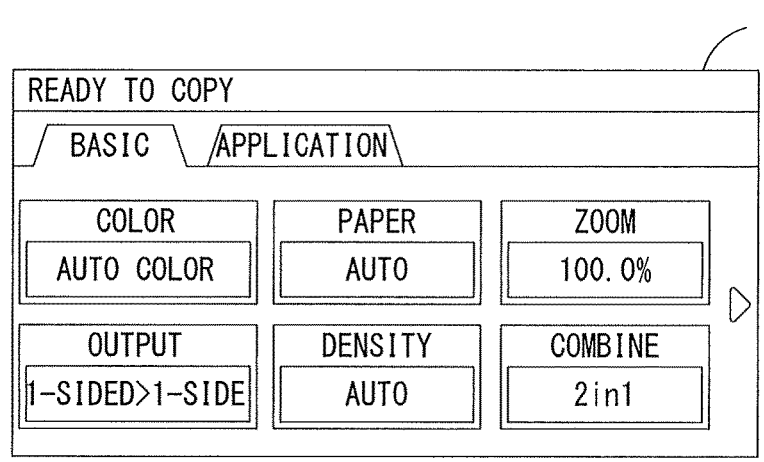
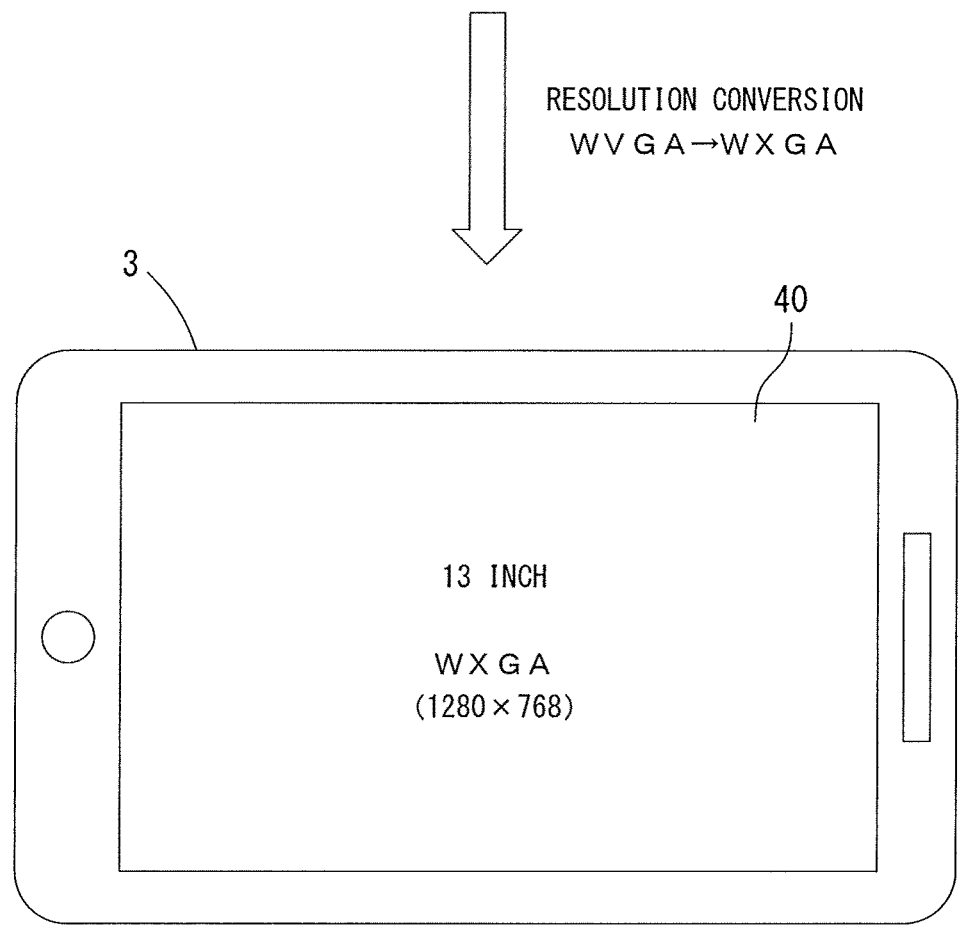

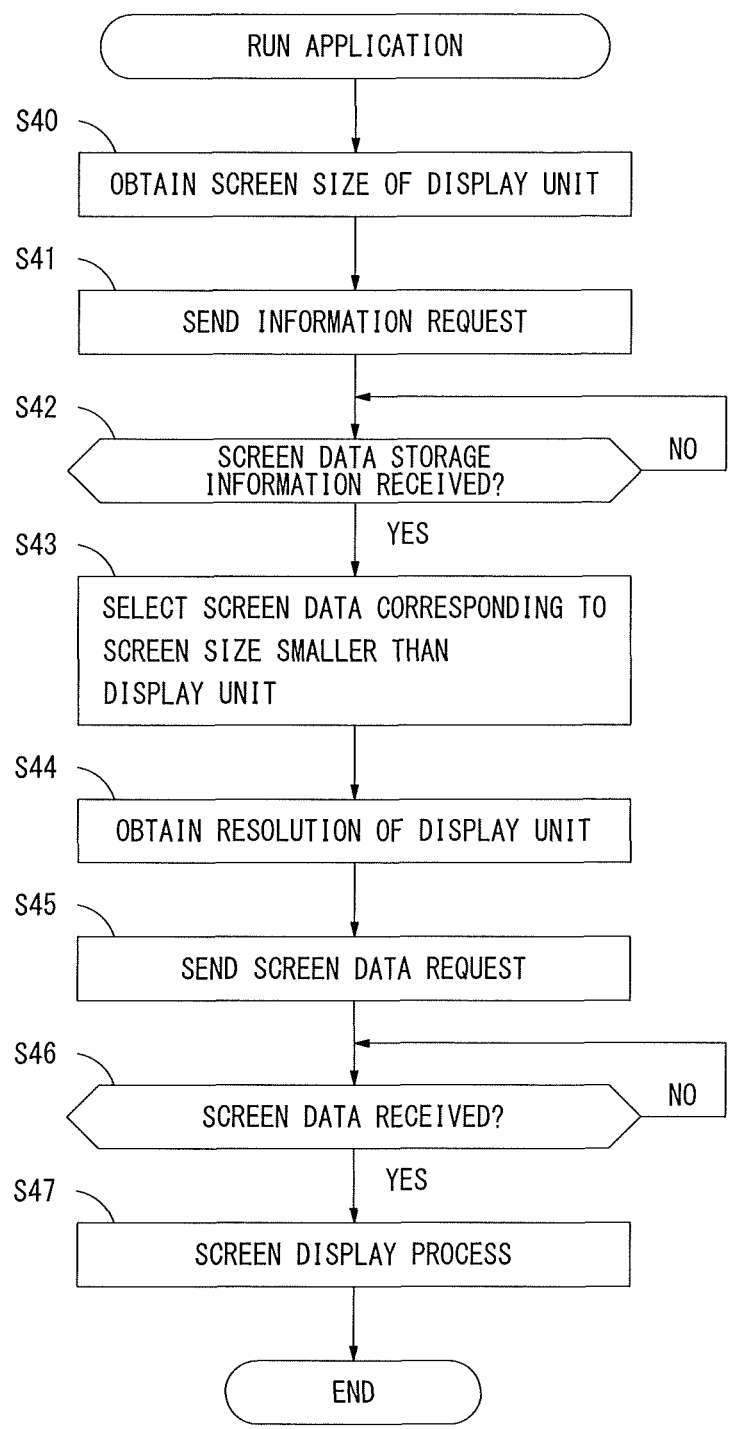

IMAGE PROCESSING SYSTEM PERFORMING SCREEN DATA SELECTION, IMAGE PROCESSING DEVICE, TERMINAL DEVICE AND NON-TRANSITORY READABLE RECORDING MEDIUM

This application is based on the application No. 2015-009998 filed in Japan, the contents of which are hereby incorporated by reference.

BACKGROUND OF THE INVENTION

Field of the Invention

The present invention relates to an image processing system, an image processing device, a terminal device and a non-transitory readable recording medium. The present invention more specifically relates to a technique of enabling a display of a screen to operate the image processing device on a display unit of a device such as the terminal device.

Description of the Background Art

Image processing devices such as MFPs (Multifunction Peripherals) are provided with operational panels as user interfaces for users to operate like configuring a variety of settings about a job. Users are allowed to operate the operational panels by touching. Various types of screens are displayed on the operational panel, and user inputs are received. The conventional image processing device stores therein in advance multiple layout patterns defining information including a size or a position of an area placing multiple setting items. An appropriate layout pattern is selected depending on a screen size of the operational panel which differs for each device type, and a screen is formed. The screen thereby formed is displayed on the operational panel. This known technique is introduced for example in Japanese Patent Application Laid-Open No. JP 2007-166259 A (hereafter, document 1).

As terminal devices that may be operated via touch by the users such as smartphones or tablet terminals have recently become popular, the image processing device sends the screens to be displayed on the operational panel to the terminal device and enables the terminal device to display the received screens, thereby receiving remote operations from the terminal device. This known technique is introduced for example in Japanese Patent Application Laid-Open No. JP 2014-222481 A.

When the image processing device sends the screen to the terminal device and enables the terminal device to display the screen, the screen size of the operational panel differs from that of the terminal device in most cases, because there are the terminal devices having various sizes of screens. It is assumed for example the screen size of the operational panel of the image processing device is 9 inch. In this case, the image processing device stores therein the screen designed for the 9 inch screen to display on the operational panel. If the image processing device sends the screen to the terminal device that has the 7 inch screen, which is smaller than the screen size of the operational panel, the terminal device displays the screen designed for the 9 inch screen by the 7 inch screen. As a result, items such as operational keys and spaces between the operational keys are reduced and the reduced-size operational keys and spaces are displayed. It is more difficult for the users to operate the screen than the operational panel of the image processing device, and many users press wrong keys.

In order to avoid the aforementioned problem, it is considered to create the appropriate screen each time by selecting the layout pattern corresponding to the screen size of the terminal device from among the multiple layout patterns as described in the known technique of document 1, for example. In this case, however, the layout patterns appropriate for each screen size of the various types of the terminal devices need to be prepared in advance. Thus, it is not preferable because huge number of the layout patterns need to be stored by the image processing devices and a storage area is occupied. According to the known technique of document 1, the layout pattern differs for each screen size so that the position where the operational key is displayed or the size of the operational key in the screen may apparently differ, resulting in reduction of an operability.

SUMMARY OF THE INVENTION

The present invention is intended to solve the above problems. Thus, the present invention is intended to provide an image processing system, an image processing device, a terminal device and a non-transitory computer readable recording medium capable of outputting a user-friendly screen.

First, the present invention is directed to an image processing system comprising: a terminal device that is provided with a display part; and an image processing device that outputs screen data to the terminal device, thereby enabling the display part to display a screen based on the screen data.

According to one aspect of this invention, the image processing device includes: a storage part in which multiple types of the screen data corresponding to respective screen sizes are stored; a screen information obtaining part that obtains information relating to the screen size of the display part; a screen data selecting part that selects the screen data corresponding to the screen size smaller than the screen size of the display part from among the multiple types of the screen data based on the information obtained by the screen information obtaining part; and an output part that outputs the screen data selected by the screen data selecting part to the terminal device.

Second, the present invention is directed to an image processing device that outputs screen data to a display part, thereby enabling the display part to display a screen based on the screen data.

According to one aspect of this invention, the image processing device comprises: a storage part in which multiple types of the screen data corresponding to respective screen sizes are stored; a screen information obtaining part that obtains information relating to the screen size of the display part; a screen data selecting part that selects the screen data corresponding to the screen size smaller than the screen size of the display part from among the multiple types of the screen data based on the information obtained by the screen information obtaining part; and an output part that outputs the screen data selected by the screen data selecting part to the display part.

Third, the present invention is directed to a non-transitory computer readable recording medium storing a program to be executed by an image processing device capable of managing multiple types of screen data corresponding to respective screen sizes.

According to one aspect of this invention, the program executed on the image processing device to function as a system comprising: a screen information obtaining part that obtains information relating to the screen size of a display part which is a target of an output of the screen data; a screen data selecting part that selects the screen data corresponding to the screen size smaller than the screen size of the display part from among the multiple types of the screen data based on the information obtained by the screen information obtaining part; and an output part that outputs the screen data selected by the screen data selecting part to the display part.

Fourth, the present invention is directed to a terminal device capable of communicating with an image processing device that stores therein multiple types of screen data corresponding to respective screen sizes.

According to one aspect of this invention, the terminal device comprises: a display part in a predetermined screen size; an information obtaining part that obtains information relating to the multiple types of the screen data from the image processing device; a screen data requesting part that selects the screen data corresponding to the screen size smaller than the screen size of the display part from among the multiple types of the screen data based on the information obtained by the information obtaining part and sends a request to the image processing device; and a display controller that obtains the screen data corresponding to the screen size requested by the screen data requesting part from the image processing device, and enables the display part to display a screen based on the screen data.

BRIEF DESCRIPTION OF THE DRAWINGS

FIG. 3 shows an example of multiple types of screen data stored in the image processing device;

FIG. 7 shows an example of a resolution conversion by a resolution converting part;

FIG. 14 is a flow diagram explaining an exemplary sequential procedure of the process performed at the terminal device of the second preferred embodiment.

DESCRIPTION OF THE PRESENT PREFERRED EMBODIMENTS

Figure 1:
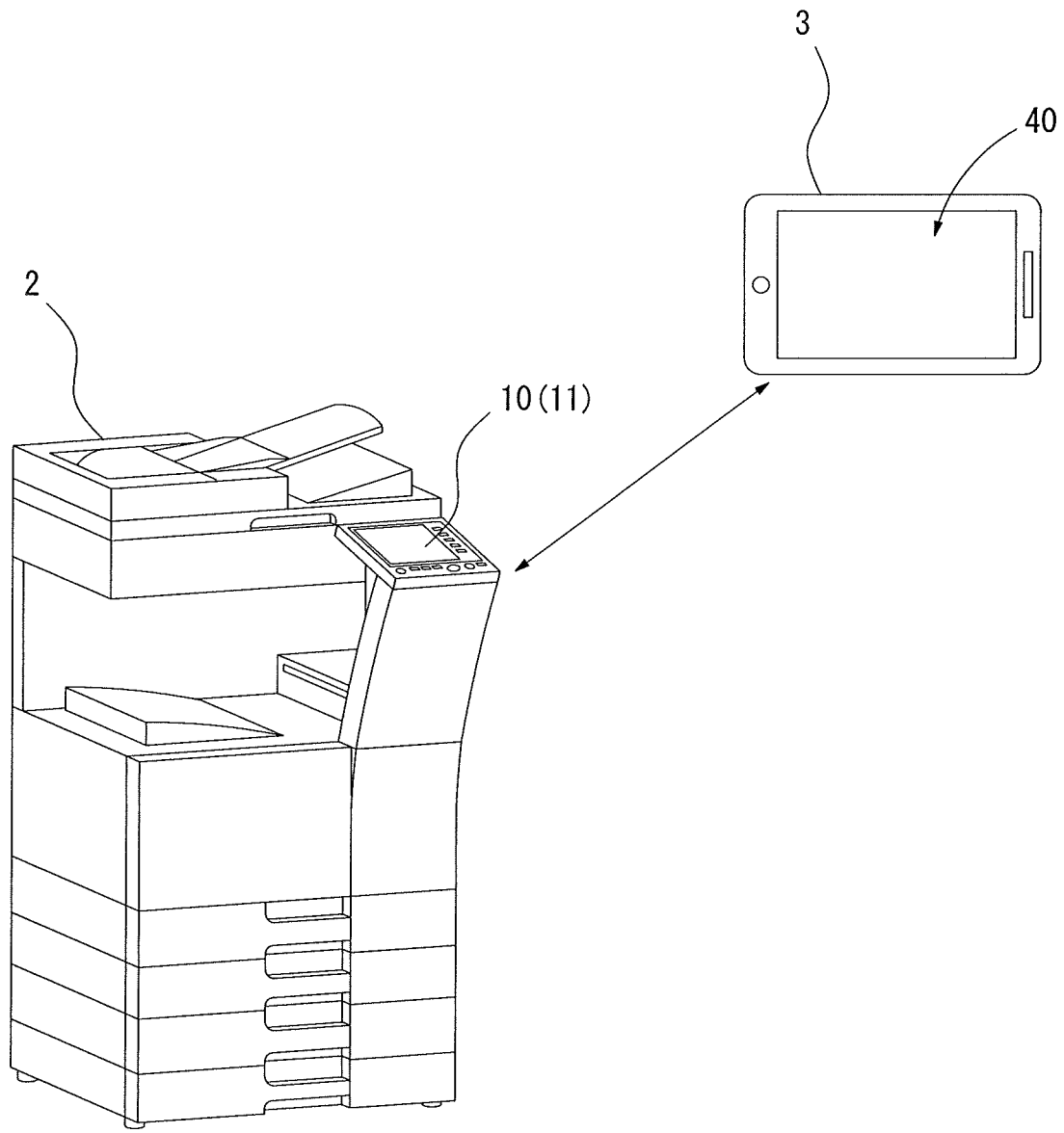
FIG. 1 shows an exemplary configuration of an image processing system.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary configuration of an image processing system 1 of the first preferred embodiment of the present invention. The image processing system 1 comprises an image processing device 2 constructed by a device such as one of MFPs and a terminal device 3 constructed by a device such as a personal computer (PC), a tablet terminal or a smartphone. The image processing device 2 and the terminal device 3 are capable of sending and receiving data to and from each other over a network such as a LAN (Local Area Network) or a radio communication mean such as a Bluetooth (registered trademark) or a NFC (Near Field Communication).

The image processing device 2 includes multiple functions such as a copy function, a scan function, a print function and a fax function, for example. The image processing device 2 activates the function selected by the user, thereby executing a job. The image processing device 2 is provided with an operational panel 10, which is a user interface for the user to select the function, configure settings about a job and/or give an instruction to execute the job. The operational panel 10 includes a display unit 11 in a predetermined size formed from a device such as a color liquid crystal display, for example. The image processing device 2 receives a user operation as displaying a variety of screens on which the user is allowed to operate on the display unit 11 of the operational panel 10. The image processing device 2 sends screen data of the screen stored in advance to display on the operational panel 10 to the terminal device 3 over the network, thereby enabling the terminal device 3 to display the screen.

The terminal device 3, on the other hand, includes a display unit 40 in a predetermined screen size formed from a device such as a color liquid crystal display, for example, to display a variety of information. As described later, an application program 49 (see FIG. 5) for working in concert with the image processing device 2 is installed in advance on the terminal device 3. The terminal device 3 executes the application program 49, thereby communicating with the image processing device 2. After receiving screen data from the image processing device 2, the terminal device 3 displays a screen based on the received screen data on the display unit 40. Hence, the user is allowed to operate the terminal device 3 with viewing the screen displayed on the terminal device 3, and operate the image processing device 2 via the remote control.

The screen size of the display unit 40 of the terminal device 3 may match with that of the display unit 11 of the operational panel 10 of the image processing device 2, but sometimes may not. The image processing device 2 of the first preferred embodiment is configured to generate the screen data based on which the user-friendly screen may be displayed and send to the terminal device 3 regardless of the screen size of the display unit 40 of the terminal device 3. The image processing device 2 and the terminal device 3 are described in detail next.

Figure 2:
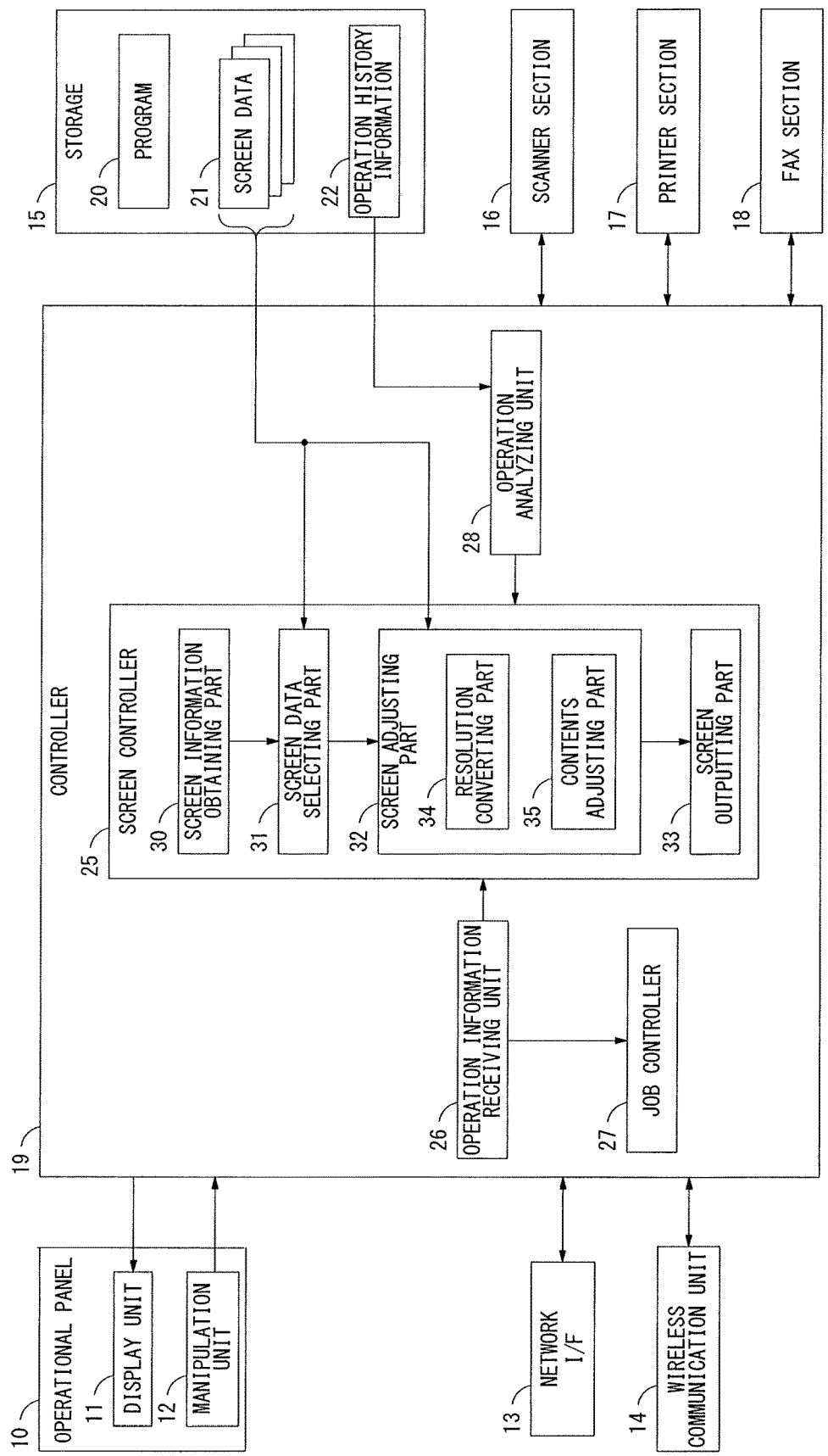
FIG. 2 is a block diagram showing an example of a hardware structure and that of a functional structure of an image processing device.

FIG. 2 is a block diagram showing an example of a hardware structure and that of a functional structure of the image processing device 2. The image processing device 2 includes the operational panel 10, a network interface 13, a wireless communication unit 14, a storage 15, a scanner section 16, a printer section 17, a fax section 18 and a controller 19.

The operational panel 10 includes a manipulation unit 12 besides the aforementioned display unit 11. The manipulation unit 12 is formed with parts such as touch panel keys arranged on the screen of the display area of the display unit 11 and push-button keys arranged around the display area of the display unit 11, for example. The manipulation unit 2 receives inputs by the user. In what follows, the screen size of the display unit 11 is 9 inch as for the example.

The network interface 13 connects the image processing device 2 to the network such as LAN. The wireless communication unit 14 establishes wireless communication such as Bluetooth (registered trademark) or a NFC (Near Field Communication). The wireless communication unit 14 is, for example, capable of establishing one-to-one communication with the terminal device 3.

The storage 15 is formed from a nonvolatile storage device such as a hard disk drive (HDD) or a solid state drive (SSD), for instance. Information including the variety of a program 20 executed at the image processing device 2, multiple types of screen data 21 relating to the multiple screens to be displayed on the display unit 11 of the operational panel 10 and operation history information 22 including operation history of the user is stored in the storage 15. Data in which the screen size or a resolution different for each screen is recorded as the screen data 21.

FIG. 3 shows an example of the multiple types of screen data 21 stored in the storage 15. In the example shown in FIG. 3 shows four types of screen data 21a, 21b, 21c and 21d in the storage 15. The first screen data 21a, for instance, is designed for a display device in 7 inch, and has a resolution of WVGA (800×480). The second screen data 21b, for instance, is designed for the display device in 9 inch, and has the resolution of WVGA. The third screen data 21c, for instance, is designed for the display device in 15 inch, and has the resolution of WVGA. The fourth screen data 21d, for instance, is designed for the display device in 15 inch, and has the resolution of WXGA (1280×768). Each screen data 21 corresponds to the different screen size and the resolution. In the example of FIG. 3, the smallest screen size is 7 inch. This smallest size is preferably the size under the assumption that the screen is displayed on a relatively small screen such as the smartphone.

Figure 4A:
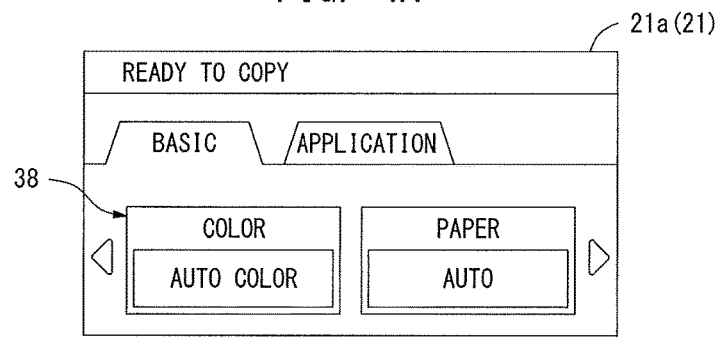
FIGS. 4A, 4B and 4C show an example of detailed screen structures of the multiple types of screen data.
Figure 4B:
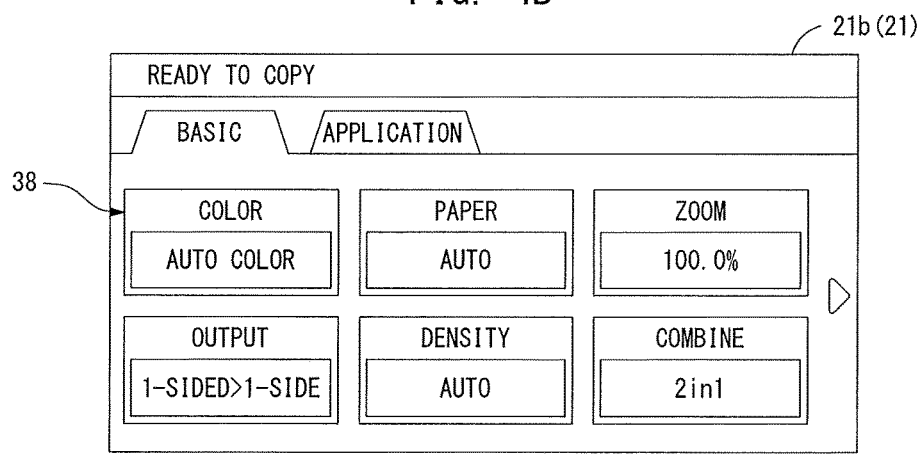
Figure 4C:
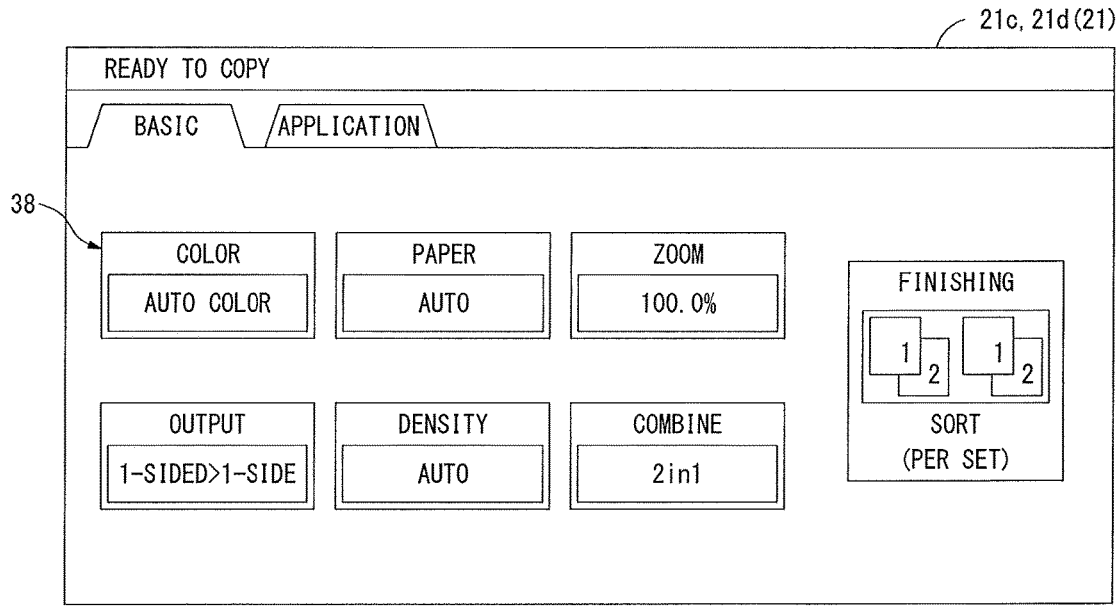

FIGS. 4A, 4B and 4C show an example of detailed screen structures of the multiple types of screen data. FIG. 4A shows an example of the screen data 21a designed for the display device in 7 inch. FIG. 4B shows an example of the screen data 21b designed for the display device in 9 inch. FIG. 4C shows an example of the screen data 21c and 21d designed for the display device in 15 inch. The multiple types of screen data 21a, 21b, 21c and 21d contains the multiple operational keys for the user to configure the settings about a job, for instance, as contents 38. A character string to show data such as the setting item to the user is included in each content 38. Each content 38 included in the respective multiple types of screen data 21a, 21b, 21c and 21d is designed to be the same size in the screen when it is displayed by the display device corresponding to each screen size. The number of the contents 38 displayed in the screen by the respective multiple types of screen data 21a, 21b, 21c and 21d depends on the screen size. To be more specific, the screen data 21a corresponds to the small screen size. Only two contents 38 in a predetermined size are displayed in the screen, and a scrolling is required to display the other contents 38. The screen data 21b corresponds to the larger screen size than the screen data 21a. Six contents 38 in the predetermined size are displayed in the screen, and the scrolling is required to display the other contents 38 as well as the screen data 21a. On the other hand, the screen data 21c and 21d correspond to the large screen size. Every content 38 in the predetermined size may be displayed in the screen, and the scrolling is not required to display the other contents 38. As the screen data 21c and 21d have different resolutions, the number of dots (the number of pixels) for displaying one of the contents 38 differs. In the screen displayed based on each type of screen data 21a, 21b, 21c and 21d by the display device matching with the respective multiple types of screen data 21a, 21b, 21c and 21d, the content 38 for the user to operate is displayed by almost the same size so that it is easy for the user to operate. Moreover, the screen structure is less likely to cause incorrect operations.

Referring back to FIG. 2, the scanner section 16 is brought into operation when the function such as the copy function, the scan function or the fax transmission function is selected by the user. The scanner section 16 optically reads an image of a document placed by the user and generates image data. The printer section 17 becomes operative when the copy function or the print function is selected by the user, or the fax section 18 receives fax data over a public phone line. The printer section 17 produces a printed output by forming images on a sheet material such as a printing sheet based on the received image data. The fax section 18 transmits and receives the fax data.

The controller 19 includes a CPU and a memory that are not shown in FIG. 2. The CPU reads and executes the program 20, thereby controlling operations of each aforementioned part. The CPU executes the program 20 so that the controller 19 of the first preferred embodiment serves as a screen controller 25, an operation information receiving unit 26, a job controller 27 and a manipulation analyzing unit 28. Each of the screen controller 25, the operation information receiving unit 26, the job controller 27 and the manipulation analyzing unit 28 becomes operative when the application program 49 is executed at the terminal device 3, for example, and the image processing device 2 starts the cooperative operation with the terminal device 3.

The screen controller 25 controls the screen to display on the display unit 40 of the terminal device 3. The screen controller 25 includes a screen information obtaining part 30, a screen data selecting part 31, a screen adjusting part 32 and a screen outputting part 33.

The screen information obtaining part 30 obtains screen information including information relating to the screen size and the resolution of the display unit 40 provided with the terminal device 3. The screen information obtaining part 30 of the first preferred embodiment communicates with the terminal device 3, thereby obtaining the screen information from the terminal device 3. However, this is given not for limitation. The screen information is not necessarily obtained from the terminal device 3. The screen information obtaining part 30, for example, may obtain information such as the device type information from the terminal device 3, and access an external database based on the device type, thereby obtaining the screen information of the terminal device 3 from the database.

The screen data selecting part 31 selects one of the multiple types of screen data 21 corresponding to the respective screen sizes to send to the terminal device 3 based on the screen information obtained by the screen information obtaining part 30. If there is the screen data 21 corresponding to the screen size the same as the screen size of the display unit 40 of the terminal device 3 in the multiple types of screen data 21 corresponding to the respective screen sizes in the storage 15, the screen data selecting part 31 selects the screen data 21. If there is no screen data 21 corresponding to the screen size the same as the screen size of the display unit 40 of the terminal device 3 in the multiple types of screen data 21 corresponding to the respective screen sizes in the storage 15, the screen data selecting part 31 selects the screen data 21 corresponding to the screen size smaller than the screen size of the display unit 40 of the terminal device 3. There might be more than two types of the screen data 21 correspond to the screen size smaller than the screen size of the display unit 40 of the multiple types of screen data 21. In this case, the screen data selecting part 31 selects the screen data 21 corresponding to the largest screen size of the two or more types of screen data 21 corresponding to the screen size smaller than the screen size of the display unit 40. There might be no screen data 21 corresponding to the screen size the same or smaller than the screen size of the display unit 40 of the terminal device 3 in the multiple types of screen data 21 stored in the storage 15. In this case, the screen data selecting part 31 selects the screen data 21 corresponding to the smallest screen size of the multiple types of screen data 21. If the smallest screen size of the multiple types of screen data 21 is configured to be smaller than the screen size of any small terminal device 3 such as the smartphone as described above, the screen data corresponding to the screen size smaller than the screen size of the terminal device 3 may be selected for any kind of terminal device 3.

The screen adjusting part 32 adjusts the screen data 21 selected by the screen data selecting part 31, as required. When the screen data 21 selected by the screen data selecting part 31 corresponds to the screen size the same as the screen size of the display unit 40 and has the same resolution as the display unit 40, the adjustment of the screen data 21 is not necessary.

The screen data 21 selected by the screen data selecting part 31 may have the different resolution from the display unit 40. In this case, in order to make the screen based on the screen data 21 go full-screen on the display unit 40, it is necessary to match the resolution of the screen data 21 with that of the display unit 40. The screen adjusting part 32, therefore, includes a resolution converting part 34. The resolution converting part 34 increases or decreases the resolution of the screen data 21, thereby converting the resolution of the screen data 21 to match with that of the display unit 40. The resolution of the screen data 21 may be lower than that of the display unit 40. In this case, the resolution converting part 34 performs a pixel interpolation to increase the resolution of the screen data 21, thereby matching with the resolution of the display unit 40. The resolution of the screen data 21 may be higher than that of the display unit 40. In this case, the resolution converting part 34 performs a pixel decimation to decrease the resolution of the screen data 21, thereby matching with the resolution of the display unit 40.

The screen adjusting part 32 includes a content adjusting part 35. It is assumed for example that the screen data 21 corresponds to the screen size smaller than the screen size of the display unit 40 is selected by the screen data selecting part 31. In this case, the content adjusting part 35 enlarges or reduces each content 38 one by one included in the screen data 21, thereby adjusting the display size of the contents 38 displayed on the display unit 40 to be a predetermined size. To be more specific, the content adjustment performed by the content adjusting part 35 unifies the display size of the operational key and/or the characters contained in the operational key included in the screen to be displayed on the display unit 40 to the predetermined size, and makes a good-looking, resulting in improvement in the operability of the screen.

When the resolution conversion is performed by the resolution converting part 34, for instance, the content adjusting part 35 enlarges or reduces each content 38 one by one included in the screen data 21 which has the converted resolution by the resolution converting part 34, thereby adjusting the display size of the contents 38 to be the predetermined size. The screen data 21 may have the blurred character in the content 38 or the blurred outline of the operational key after the resolution conversion is performed by the resolution converting part 34. Alternatively, the smooth outline may be the sharped outline. In such cases, if the content adjusting part 35 enlarges or reduces the content 38 included in the screen data 21 which has the converted resolution, a boundary area of the operational keys may be difficult to be determined and the characters may not be read correctly. In order to avoid this problem, if there is any screen data 21 which has the higher resolution than that of the display unit 40 in the multiple types of screen data 21, for instance, the content adjusting part 35 obtains the content 38 included in the screen data 21 which has high resolution in the storage 15. The content adjusting part 35 then enlarges or reduces each content 38 included in the screen data 21 which has high resolution and generates the contents to display. The content adjusting part 35 combines the contents to display with content areas included in the screen data 21 which has the converted resolution, respectively, thereby generating the screen data to output. As a result, the determination level of the boundary area of the operational keys is not decreased, and the characters can be read correctly. The display size of the operational key and/or the characters contained in the operational key included in the screen displayed on the display unit 40 is unified to the predetermined size, resulting in the improvement in the operability. The detailed example of the screen adjustment by the screen adjusting part 32 is explained later.

The screen outputting part 33 outputs the screen data 21. The screen data 21 thereby output is that selected by the screen data selecting part 31 or that selected by the screen data selecting part 31 and adjusted by the screen adjusting part 32. The screen outputting part 33 converts the screen data 21 into bitmap data, thereby sending it to the terminal device 3 via the network interface 13 or the wireless communication unit 14.

When the aforementioned screen controller 25 becomes operative and the screen data 21 is sent to the terminal device 3, the controller 19 terminates the function of the operational panel 10 as the user interface. As a result, this may prevent different operation is performed at the terminal device 3 and the operational panel 10.

The operation information receiving unit 26 receives operation information based on the user operation. As the screen is displayed on the display unit 11 of the operational panel 10, for example, the operation information receiving unit 26 receives the operation information from the manipulation unit 12 of the operational panel 10. When the screen data 21 has already been sent to the terminal device 3 by the screen controller 25, the operation information receiving unit 26 receives the operation information from the terminal device 3. In response to receiving the operation information, the operation information receiving unit 26 records the operation information in the operation history information 22. Also, the operation information receiving unit 26 records information such as the operation time receiving the operation information in the operation history information 22. Also, after receiving the operation information, the operation information receiving unit 26 outputs the received operation information to the screen controller 25 and the job controller 27. The screen controller 25 is allowed to update the screen data 21 to send to the terminal device 3 based on the user operation, and apply the user operation to the screen displayed at the terminal device 3.

The job controller 27 configures settings about the job based on the operation information from the operation information receiving unit 26. The operation information may instruct the execution of the job. In this case, the job controller 27 activates each of the scanner section 16, the printer section 17 and the fax section 18, thereby controlling the execution of the job selected by the user.

The manipulation analyzing unit 28 becomes operative when the screen controller 25 becomes operative and sends the screen data 21 to the terminal device 3, for example. The manipulation analyzing unit 28 reads the operation history information 22 in a predetermined period of time or at a predetermined timing as the screen based on the screen data 21 is displayed at the terminal device 3, and analyzes the operation information recorded as the operation history information 22. In this analysis, it is analyzed whether or not a frequency to have a predetermined operation such as the operation to cancel the current settings or the operation to put the screen back to the current screen has increased. Alternatively, it is analyzed whether or not the interval of time the user operation is made has increased. To be more specific, the manipulation analyzing unit 28 determines if the user is allowed to make the operation smoothly on the screen as the screen based on the screen data 21 received from the screen controller 25 is displayed at the terminal device 3. The manipulation analyzing unit 28 may detect the increase in the frequency of the predetermined operation by the user or in the operation time by the user through the analysis, then notifies the screen controller 25 of the detected result.

After receiving the notification from the manipulation analyzing unit 28, the screen controller 25 finds out that the user of the terminal device 3 is not allowed to operate smoothly. In this case, the screen data selecting part 31 changes the screen data 21 selected as the target of output to the terminal device 3 to the screen data 21 corresponding to the screen size different from the current one. As a result, the screen displayed at the terminal device 3 may be switched to another screen, resulting in improvement in the operability of the screen.

Figure 5:
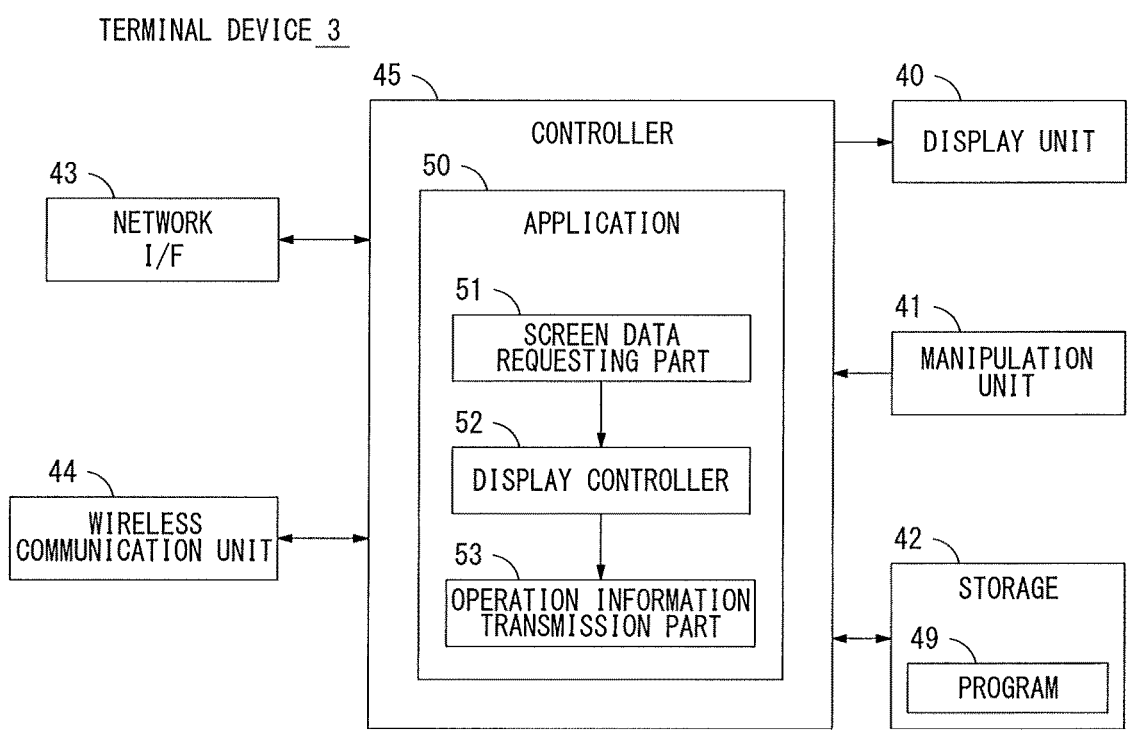
FIG. 5 is a block diagram showing an example of a hardware structure and that of a functional structure of a terminal device.

FIG. 5 is a block diagram showing an example of a hardware structure and that of a functional structure of the terminal device 3. The terminal device 3 includes the aforementioned display unit 40, a manipulation unit 41, a storage 42, a network interface 43, a wireless communication unit 44 and a controller 45.

The screen size of the display unit 40 may be arbitrarily selected, however, the display unit 40 in 13 inch is given as an example described below. The manipulation unit 41 formed from a touch panel arranged on a display screen of the display unit 40, for instance, receives user inputs. The storage 42 formed from a nonvolatile storage device such as a hard disk drive (HDD) or a solid state drive (SSD), for instance, stores therein the application program 49 installed in advance on the terminal device 3. The network interface 43 connects the terminal device 3 to the network such as LAN. The wireless communication unit 44 establishes wireless communication such as Bluetooth (registered trademark) or the NFC (Near Field Communication). The wireless communication unit 44 is, for example, capable of establishing one-to-one communication with the image processing device 2.

The controller 45 includes a CPU and a memory that are not shown in FIG. 5. The CPU reads and executes the application program 49, thereby enabling the controller 45 to serve as an application 50 that works in concert with the image processing device 2. The application 50 includes a screen data requesting part 51, a display controller 52 and an operation information transmission part 53. The application 50 communicates with the image processing device 2 via the network interface 43 or the wireless communication unit 44, thereby obtaining the screen data 21 from the image processing device 2 and displaying the screen based on the screen data 21 on the display unit 40.

The screen data requesting part 51 requests for the transmission of the screen data 21 to the image processing device 2. According to the first preferred embodiment, as the application 50 becomes operative on the controller 45, the screen data requesting part 51 is brought into operation at first to request for the transmission of the screen data 21 to the image processing device 2. To be more specific, the screen data requesting part 51 obtains the screen information including the information of the screen size and/or the resolution of the display unit 40, and sends the screen information to the image processing device 2, thereby requesting the transmission of the screen data 21 that matches with the screen information.

The display controller 52 obtains the screen data 21 corresponding to the screen size selected at the image processing device 2 based on the information received from the screen data requesting part 51 from the image processing device 2, and enables the screen based on the screen data 21 to be displayed on the display unit 40. The screen data 21 sent from the image processing device 2 to the terminal device 3 is the bitmap data that matches with the resolution of the display unit 40. The display controller 52, therefore, is allowed to enable the whole screen based on the screen data 21 go full-screen on the display unit 40. The display controller 52 outputs the screen based on the received screen data 21 to the display unit 40 and updates the screen displayed on the display unit 40 to the previous one for every receipt of the screen data 21 from the image processing device 2.

When the manipulation unit 41 detects the user operation as the screen based on the screen data 21 is displayed on the display unit 40, the operation information transmission part 53 generates operation information based on the detected operation and sends the generated operation information to the image processing device 2. The operation information contains information such as coordinate information of a position that the user touched, for instance, in the screen of the display unit 40. After receiving the operation information from the terminal device 3, the image processing device 2 is allowed to identify the operational key touched by the user based on the coordinate information in the operation information.

Figure 6:
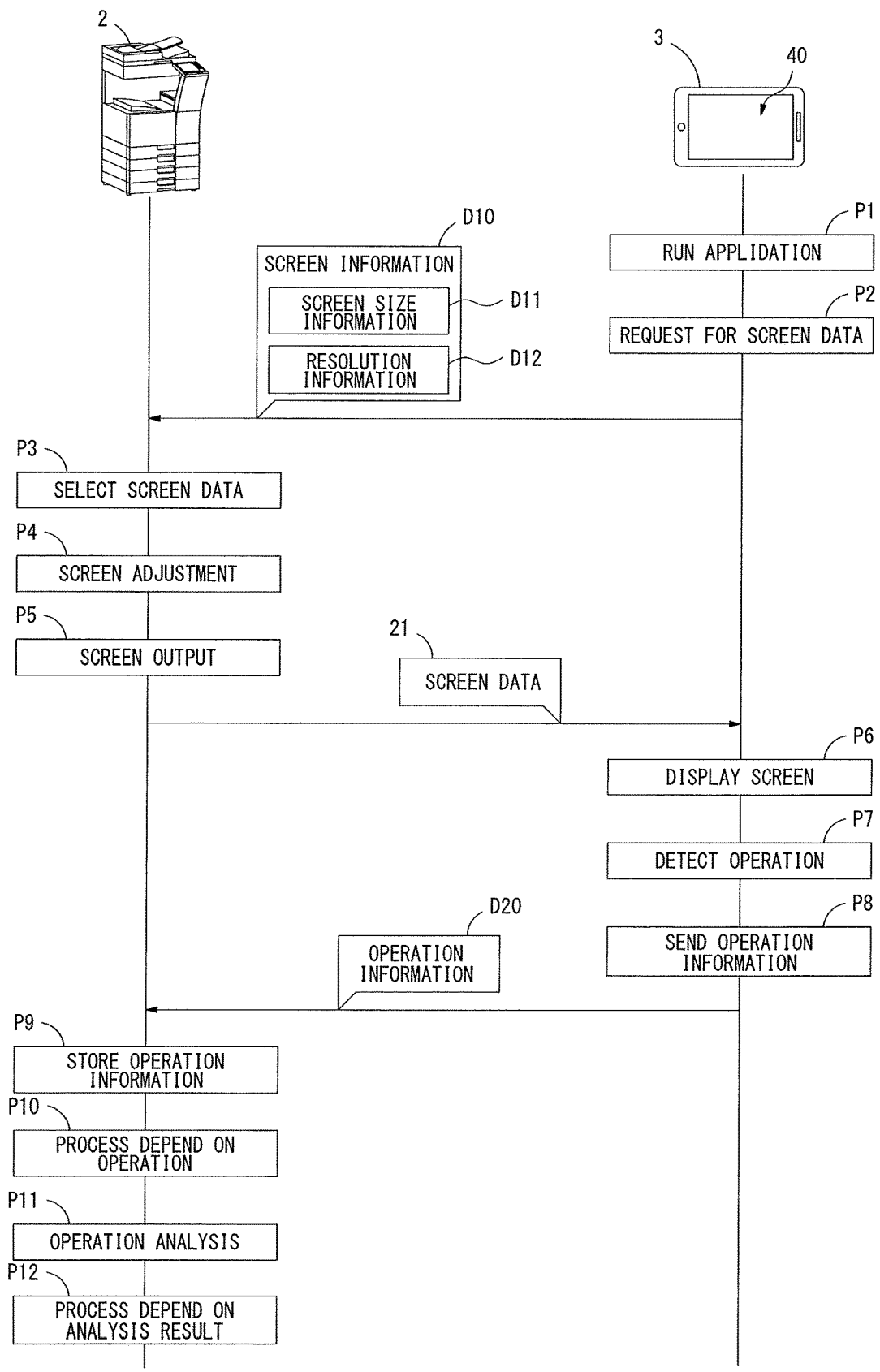
FIG. 6 shows an example of an operation process worked together by the image processing device and the terminal device.

FIG. 6 shows an example of the operation process worked together by the image processing device 2 and the terminal device 3. The terminal device 3 executes the application program 49 in response to the user operation at first, and runs the application 50 (process P1). After running the application 50, the terminal device 3 requests for the screen data (process P2). In this screen data request process, screen information D10 including screen size information D11 and resolution information D12 relating to the display unit 40 of the terminal device 3 is sent to the image processing device 2. In response to receiving the screen information D10, the image processing device 2 selects one of the multiple types of the screen data 21 based on the screen size of the display unit 40 (process P3). To be more specific, it is assumed that the screen size of the display unit 40 of the terminal device 3 is 13 inch. In this case, the image processing device 2 selects the screen data 21b designed for the display device in 9 inch from among the multiple types of the screen data 21a, 21b, 21c and 21d as shown in FIG. 3 if the screen size of the display unit 40 of the terminal device 3 is 13 inch.

The image processing device 2 performs the screen adjustment to adjust the selected screen data 21b as required (process P4). In the screen adjustment, the resolution conversion by the resolution converting part 34 and/or the content adjustment by the content adjusting part 35 is performed.

FIG. 7 shows an example of the resolution conversion by the resolution converting part 34. As shown in FIG. 7, for instance, the screen data 21b selected by the screen data selecting part 31 has the resolution of WVGA (800×480). It is assumed that the display unit 40 of the terminal device 3 has the resolution of WXGA (1280×768). In this case, the resolution converting part 34 performs the pixel interpolation to increase the resolution of the screen data 21b, thereby increasing the resolution of the screen data 21b by 1.6 times and generating the screen data has the resolution of WXGA.

Figure 8:
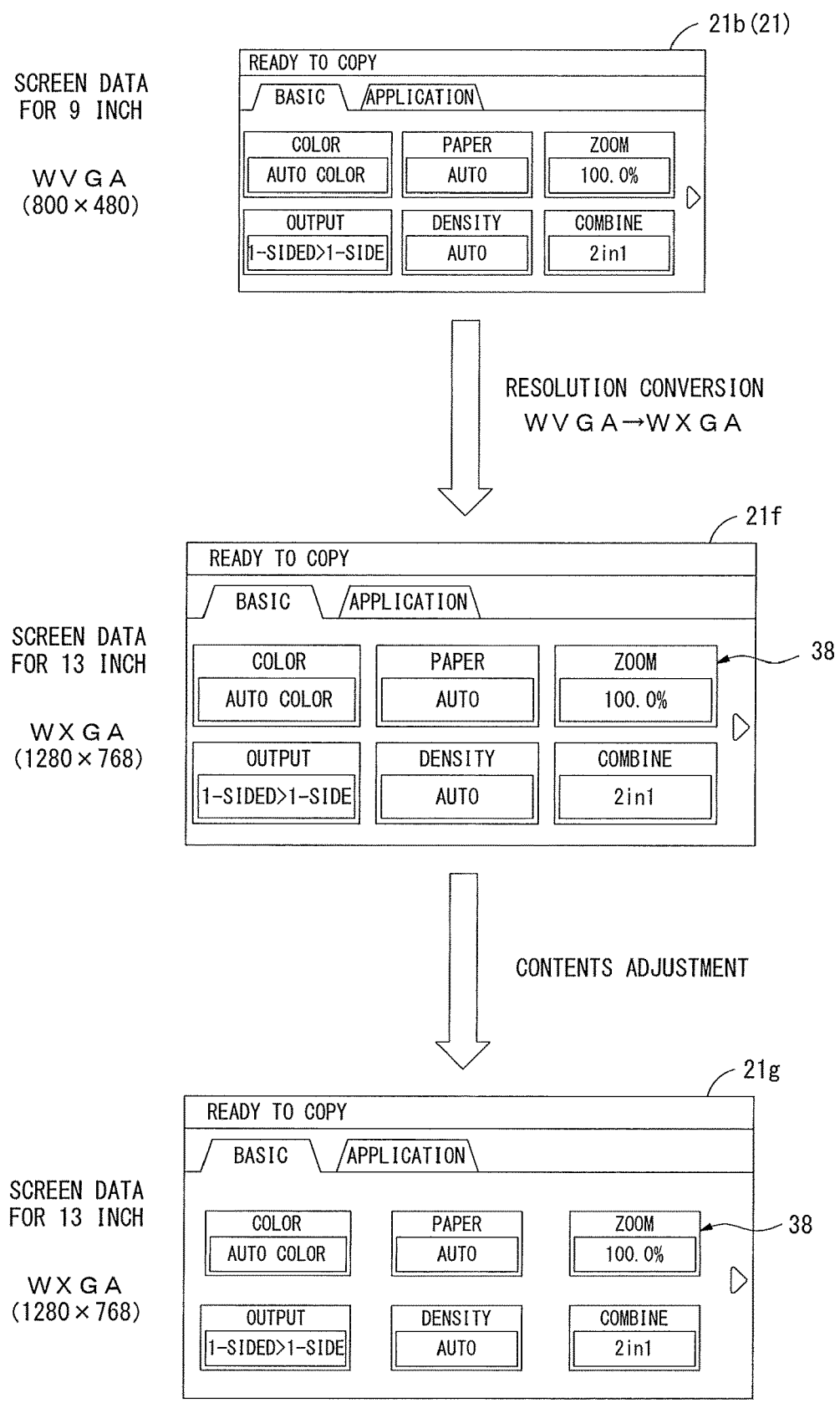
FIG. 8 shows an example of a process of both the resolution conversion and a content adjustment.

FIG. 8 shows an example of the process of both the resolution conversion by the resolution converting part 34 and the content adjustment by the content adjusting part 35. It is assumed for example the resolution converting part 34 converts the resolution of the screen data 21b for the display in 9 inch, and generates screen data 21f for 13 inch display as shown in FIG. 8. The display size of the content 38 corresponding to the operational key in the screen data 21f becomes large. If the display size of the content 38 becomes large as described above, the content adjusting part 35 reduces the content 38 included in the screen data 21, thereby adjusting the screen based on the screen data 21b for the 9 inch display to be almost the same size as the display size of the content 38 when it is displayed on the display unit 11 of the operational panel 10. Hence, the user is allowed to sight the information such as the operational key displayed at the terminal device 3 the same as when the screen is displayed on the display unit 11 of the operational panel 10, resulting in improvement in operability. This content adjustment as described above may be performed only for the character parts included in the content 38.

Figure 9:
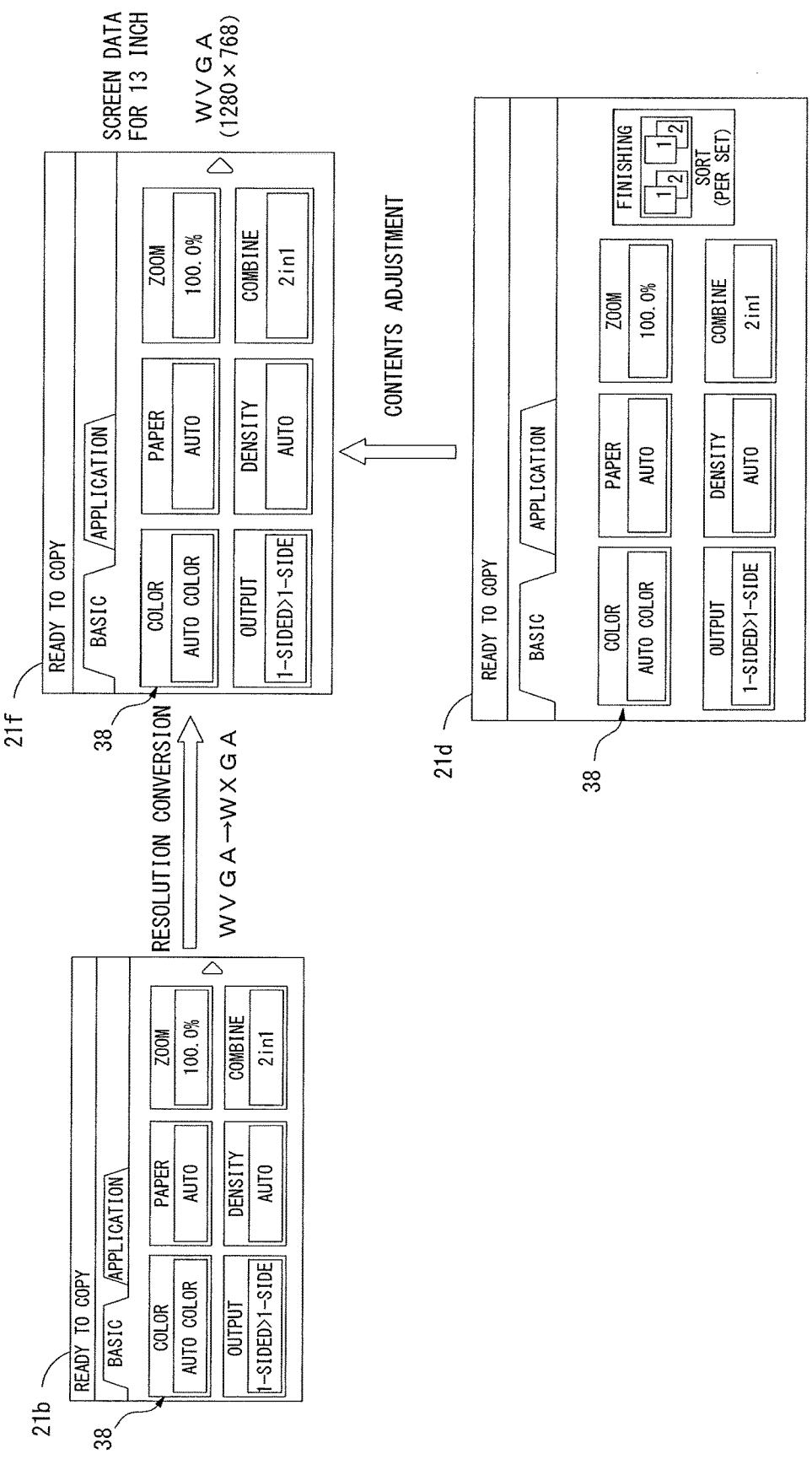
FIG. 9 shows an example when the content adjustment is performed with using a content included in the screen data that has a higher resolution than a display unit.

FIG. 9 shows an example when the content adjustment is performed with using the content 38 included in the screen data 21 that has the higher resolution than the display unit 40. It is assumed, as the same as FIG. 8, for example the resolution converting part 34 converts the resolution of the screen data 21b for the display in 9 inch, and generates the screen data 21f for 13 inch display. The display size of the content 38 corresponding to the operational key in the screen data 21f then becomes large. In this case, the content adjusting part 35 adjusts the contents by using the screen data 21d for 15 inch display which has higher resolution than the display unit 40. To be more specific, the content adjusting part 35 extracts the content 38 in the screen data 21d for 15 inch display which has the high resolution, and combines with the content area of the screen data 21f, thereby realizing the improvement in the readability of the characters in compared to the case when reducing the content 38 in the screen data 21f as it is. In also this case, in order to display the operational key or the character included in the content 38 in the predetermined size on the display unit 40, it is necessary to enlarge or reduce the content 38 extracted from the screen data 21d for the 15 inch display as required. If it is not necessary to display the operational key or the character included in the content 38 in the predetermined size on the display unit 40, the aforementioned content adjustment is not required.

Referring back to FIG. 6, the image processing device 2 outputs the screen data (process P5). Thorough this process, the screen data 21 is sent to the terminal device 3 from the image processing device 2. The screen data 21 thereby sent is the screen data 21 selected in the process P3 and is the processed screen data 21 when the screen adjustment in the process P4 is performed.

In response to receiving the screen data 21 from the image processing device 2, the terminal device 3 displays the screen based on the received screen data 21 on the display unit 40 (process P6). After detecting the user operation (process P7), the terminal device 3 generates operation information D20 based on the user operation, and sends the generated operation information (process P8). The operation information D20 is then sent to the image processing device 2 from the terminal device 3.

After receiving the operation information D20 from the terminal device 3, the image processing device 2 records the operation information D20 and stores the operation history information 22 (process P9). The image processing device 2 performs the process depending on the user operation made on the screen displayed at the terminal device 3 (process P10). It is assumed for example the image processing device 2 sends the new screen data 21 to the terminal device 3, configures the settings about the job or controls the execution of the job to update the screen displayed at the terminal device 3 in response to the user operation. The image processing device 2 repeatedly performs the process in aforementioned process P3 to P5 to update the screen displayed at the terminal device 3.

The image processing device 2 reads the operation history information 22 and performs the operation analysis at the predetermined timing (process P11). As described above, whether or not the user is allowed to operate smoothly on the screen displayed at the terminal device 3 is determined. The image processing device 2 performs the process depending on the result of the operation analysis (process P12). To be more specific, when the user is not allowed to operate smoothly on the screen displayed at the terminal device 3, the screen size of the screen data 21 which is selected by the screen data selecting part 31 from among the multiple types of the screen data 21 is changed so that the user is allowed to operate smoothly.

Figure 10:
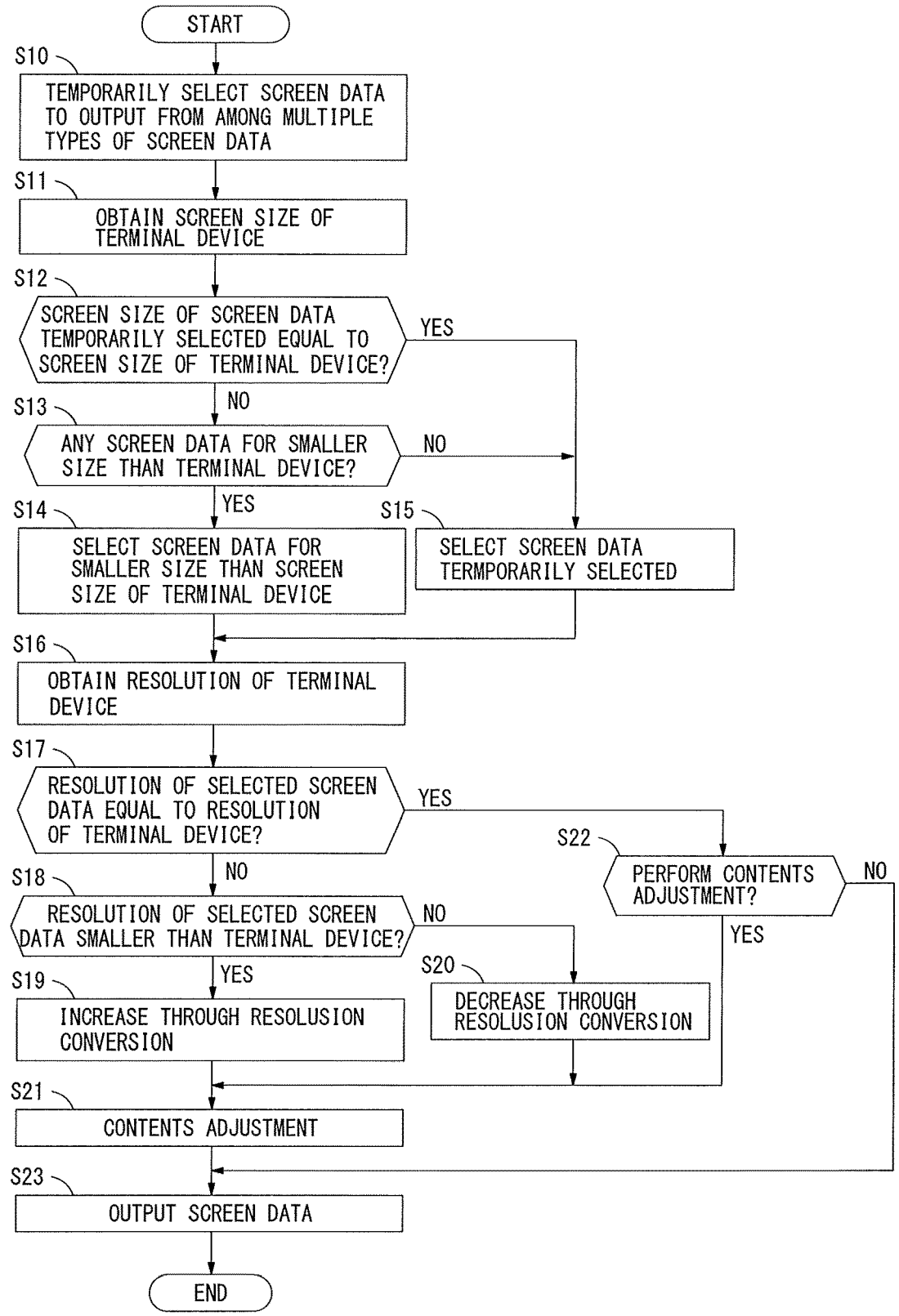
FIG. 10 is a flow diagram explaining an exemplary sequential procedure of the process performed at the image processing device.

FIG. 10 is a flow diagram explaining an exemplary sequential procedure of the process performed at the image processing device 2. This process is performed when the controller 19 serves as the screen controller 25. Upon start of the process, the image processing device 2 temporarily selects the screen data to output from among the multiple types of the screen data 21 corresponding to the respective screen sizes in the storage 15 (step S10). In this example, the screen data 21a designed for 9 inch which corresponds to the screen size of the display unit 11 of the operational panel 10 is for example temporarily selected as the target of output. The screen data which corresponds to the screen size of the display unit 11 of the operational panel 10 is not always temporarily selected as the target of output. If one of the multiple screen sizes is set as a default size, the screen data that corresponds to the default size may be temporarily selected.

The image processing device 2 then obtains the screen size of the terminal device 4 (step S11). The image processing device 2 determines if the screen size of the screen data 21a temporarily selected in step S10 and the screen size of the terminal device 3 are equal (step S12). The screen sizes may differ from each other (when a result of step S12 is NO). In this case, the image processing device 2 determines whether or not there is the screen data 21 designed for the smaller size than the screen size of the terminal device 3 in the multiple types of the screen data 21 in the storage 15 (step S13). There may be the screen data 21 designed for the smaller size than the screen size of the terminal device 3 (when a result of step S13 is YES). In this case, the image processing device 2 selects the screen data 21 designed for the smaller size than the screen size of the terminal device 3 as the target of output (step S14). More specifically, in step S14, the screen data 21 temporarily selected is changed to another screen data 21 designed for the smaller size than the screen size of the terminal device 3, and the screen data 21 to be the target of output is properly selected. If there are more than two types of the screen data 21 corresponding to the smaller size than the screen size of the terminal device 3, the image processing device 2 selects one of the more than two types of the screen data 21 corresponds to the largest size.

The screen size of the screen data 21 temporarily selected and the screen size of the terminal device 3 may be equal (when a result of step S12 is YES), or there is no screen data 21 corresponds to the smaller size than the screen size of the terminal device 3 (when a result of step S13 is NO). In such a case, the image processing device 2 selects the screen data 21 temporarily selected as the target of the output (step S15). More specifically, the screen data 21 temporarily selected is properly selected.

The image processing device 2 obtains the resolution of the terminal device 3 (step S16). The image processing device 2 determines if the resolution of the screen data 21 selected in step S14 or S15 is equal to that of the terminal device 3 (step S17). The resolution of the selected screen data 21 may be different from that of the terminal device 3 (when a result of step S17 is NO). In this case, the image processing device 2 further determines whether or not the resolution of the selected screen data 21 is lower than the resolution of the terminal device 3 (step S18). The resolution of the selected screen data 21 may be lower than that of the terminal device 3 (when a result of step S18 is YES). In this case, the image processing device 2 performs the process to increase the resolution of the selected screen data 21 through the resolution conversion (step S19). The resolution of the selected screen data 21 may be higher than that of the terminal device 3 (when a result of step S18 is NO). In this case, the image processing device 2 performs the process to decrease the resolution of the selected screen data 21 through the resolution conversion (step S20). The image processing device 2 then performs the content adjustment to display the screen based on the screen data 21 at the terminal device 3. In the content adjustment, the image processing device 2 adjusts the content such as the operational key or the character to be displayed in the predetermined size when the screen is displayed (step S21). The resolution of the selected screen data 21 selected in step S14 or S15 may equal to that of the terminal device 3 (when a result of step S17 is YES). In this case, the image processing device 2 determines whether or not to perform the content adjustment on the screen data 21 (step S22). In this determination, when the screen size of the selected screen data 21 and the screen size of the terminal device 3 are not equal, for example, the result is YES. When the screen size of the selected screen data 21 and the screen size of the terminal device 3 are equal, the result is NO. If it is determined to perform the content adjustment on the screen data 21 (when a result of step S22 is YES), the image processing device 2 performs the content adjustment to adjust the content 38 such as the operational panel or the character to be displayed in the predetermined size when the screen based on the screen data 21 is displayed at the terminal device 3 (step S21).

The image processing device 2 outputs the screen data 21 generated in each aforementioned process to the network interface 13 or the wireless communication unit 14, thereby sending it to the terminal device 3 (step S23). As the above-described process is performed at the image processing device 2, it may prevent the operational keys themselves and/or the spaces between the operational keys from being reduced and displayed at the terminal device 3. Moreover, the operational keys and the characters included in the operational keys may be displayed in the predetermined size, resulting in the improvement in the operability.

Figure 11:
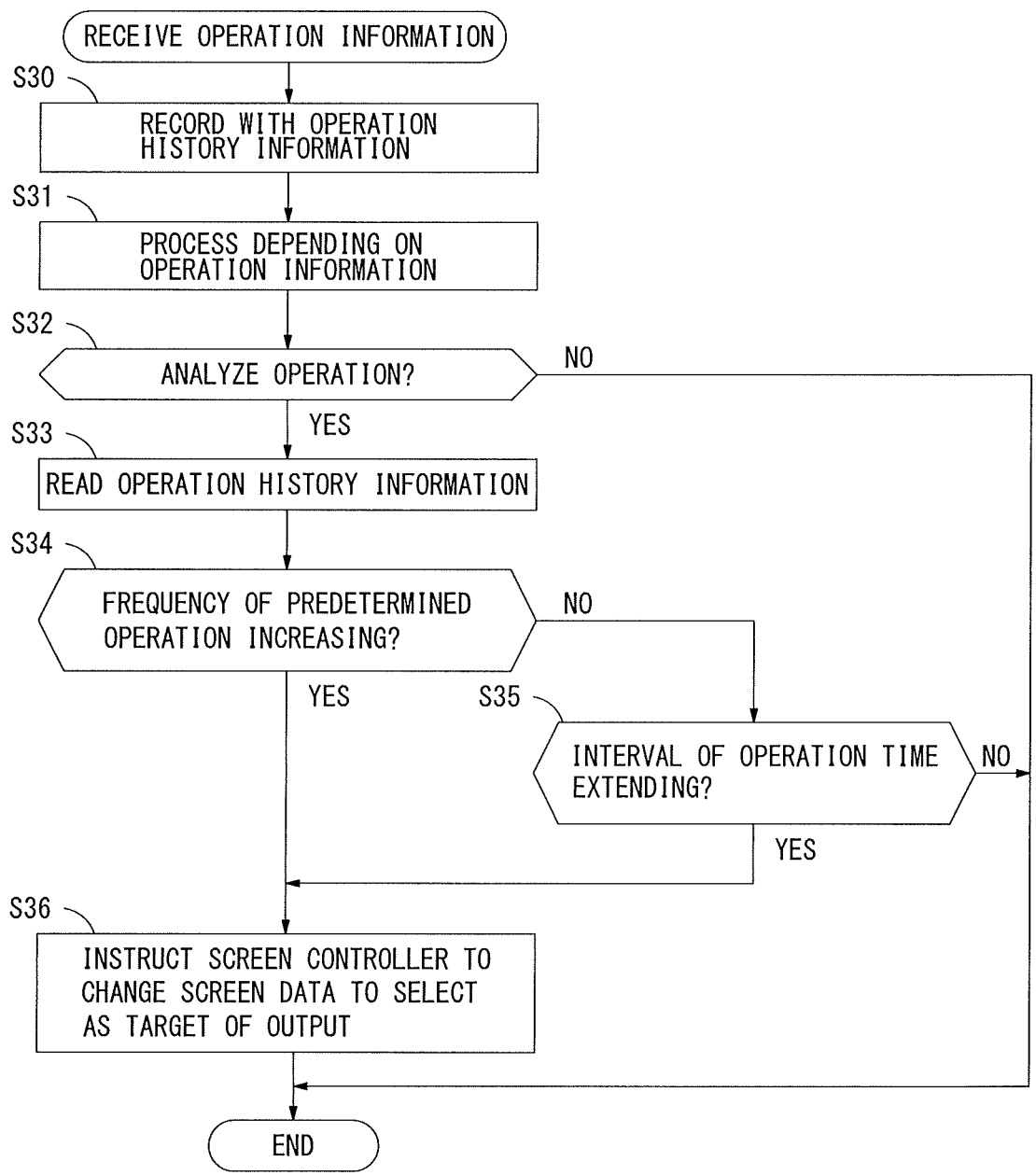
FIG. 11 is a flow diagram explaining an exemplary sequential procedure of the process when the image processing device receives operation information from the terminal device.

FIG. 11 is a flow diagram explaining an exemplary sequential procedure of the process when the image processing device 2 receives the operation information from the terminal device 3. This process is performed when the controller 19 serves as the operation information receiving unit 26, the job controller 27 and the manipulation analyzing unit 28. Upon start of the process, the image processing device 2 records the operation information D20 received from the terminal device 3 with the operation history information 22 and stores (step S30). The image processing device 2 performs the process depending on the operation information D20 (step S31). In the step S31, the process to update the displayed screen at the terminal device 3, to configure the settings about the job and/or to control execution of the job is performed.

The image processing device 2 then determines whether or not to analyze the operation (step S32). The image processing device 2 determines if the predetermined period of time has elapsed since the last operation analysis or if the operation information D20 for the predetermined number of operations is recorded with the operation history information 22, for example. When determining to analyze the operation (when a result of step S32 is YES), the image processing device 2 reads the operation history information 22 (step S33), and determines whether or not the frequency of the predetermined operation such as the user operation to cancel the previous setting or to move the screen back to the previous screen is increasing (step S34). If the frequency of the predetermined user operation is not increasing (when a result of step S34 is NO), the image processing device 2 determines whether or not the interval of the time between the user operations is extending (step S35). If the result of step S34 or S35 is YES, the image processing device 2 instructs to the screen controller 25 to change the screen data 21 to select as the target of the output (step S36). Thus, the screen size for the screen data selecting part 31 to select one of the multiple types of the screen data 21 is changed. If the result of step S34 or S35 is NO, the image processing device 2 does not perform the process in step S36. More specifically, if the user is operating smoothly as a result of the analysis of the operation information D20 recorded with the operation history information 22, the screen size for the screen data selecting part 31 to select one of the multiple types of the screen data 21 is not changed.

As described above, the image processing device 2 of the first preferred embodiment stores in advance the multiple types of the screen data 21 corresponding to the different screen size in the storage 15. The image processing device 2 obtains the information relating to the screen size of the display unit 40 provided with the terminal device 3, and selects the screen data 21 corresponding to the screen size smaller than the screen size of the terminal device 3 from among the multiple types of the screen data 21 based on the screen size of the terminal device 3, thereby outputting to the terminal device 3. As described above, for displaying the screen based on the screen data 21 at the terminal device 3, the operational keys and the spaces between the operational keys are prevented from being reduced and displayed, resulting in the improvement in the operability of the terminal device 3.

The image processing device 2 of the first preferred embodiment includes the resolution converting part 34 that converts the resolution of the screen data 21 selected by the screen data selecting part 31. The resolution converting part 34 is capable of converting the resolution of the screen data 21 to match with the resolution of the terminal device 3 when the resolution of the screen data 21 selected by the screen data selecting part 31 does not match with the resolution of the terminal device 3. Therefore, even when the resolution of the terminal device 3 is higher than that of the screen data 21, for example, the whole screen based on the screen data 21 may be displayed at the terminal device 3, resulting in improvement in the operability.

The image processing device 2 of the first preferred embodiment includes the content adjusting part 35 that enlarges or reduces each content 38 one by one included in the screen data 21, thereby adjusting the display size of the contents 38 displayed on the display unit 40 to be the predetermined size when the screen data 21 corresponding to the smaller screen size than the screen size of the display unit 40 provided with the terminal device 3 is selected. Therefore, the size of the operational keys and the characters in the operational keys looked by the users is not changed a lot on the screen displayed on the display unit 40 of the terminal device 3, resulting in improvement in the operability.

The terminal device 3 of the first preferred embodiment sends the information relating to the screen size of the display unit 40 to the image processing device 2, thereby requesting the image processing device 2 for the screen data 21 corresponding to the screen size that matches with the screen size of the display unit 40 and obtaining the screen data 21 corresponding to the screen size selected at the image processing device 2 depending on the screen size of the display unit 40 from the image processing device 2. The terminal device 3 then enables the display unit 40 to display the screen. More specifically, the terminal device 3 sends the information relating to the screen size of the display unit 40 to the image processing device 2 when the application 50 is started running. The terminal device 3 therefore is allowed to select the screen data 21 corresponding to the screen size of the display unit 40 at the image processing device 2 as described above. As a result, the terminal device 3 is allowed to display the screen easier for the user to operate.

As described above, the screen may be displayed on the display unit by selecting the screen data corresponding to the screen size smaller than the screen size of the display unit so that the reduction of the operability because of the decrease in the size of the operational keys and/or the spaces between the operational keys can be controlled. As a result, the user-friendly screen may be displayed.

Second Preferred Embodiment

The second preferred embodiment is explained next. The process to select one of the multiple types of the screen data 21 corresponding to the respective screen sizes is performed at the image processing device 2 in the above-described first preferred embodiment. In the second preferred embodiment, the process to select one of the multiple types of the screen data 21 corresponding to the respective screen sizes is performed at the terminal device 3. The structural concept of the image processing system 1 of the second preferred embodiment is the same as that explained in the first preferred embodiment.

Figure 12:
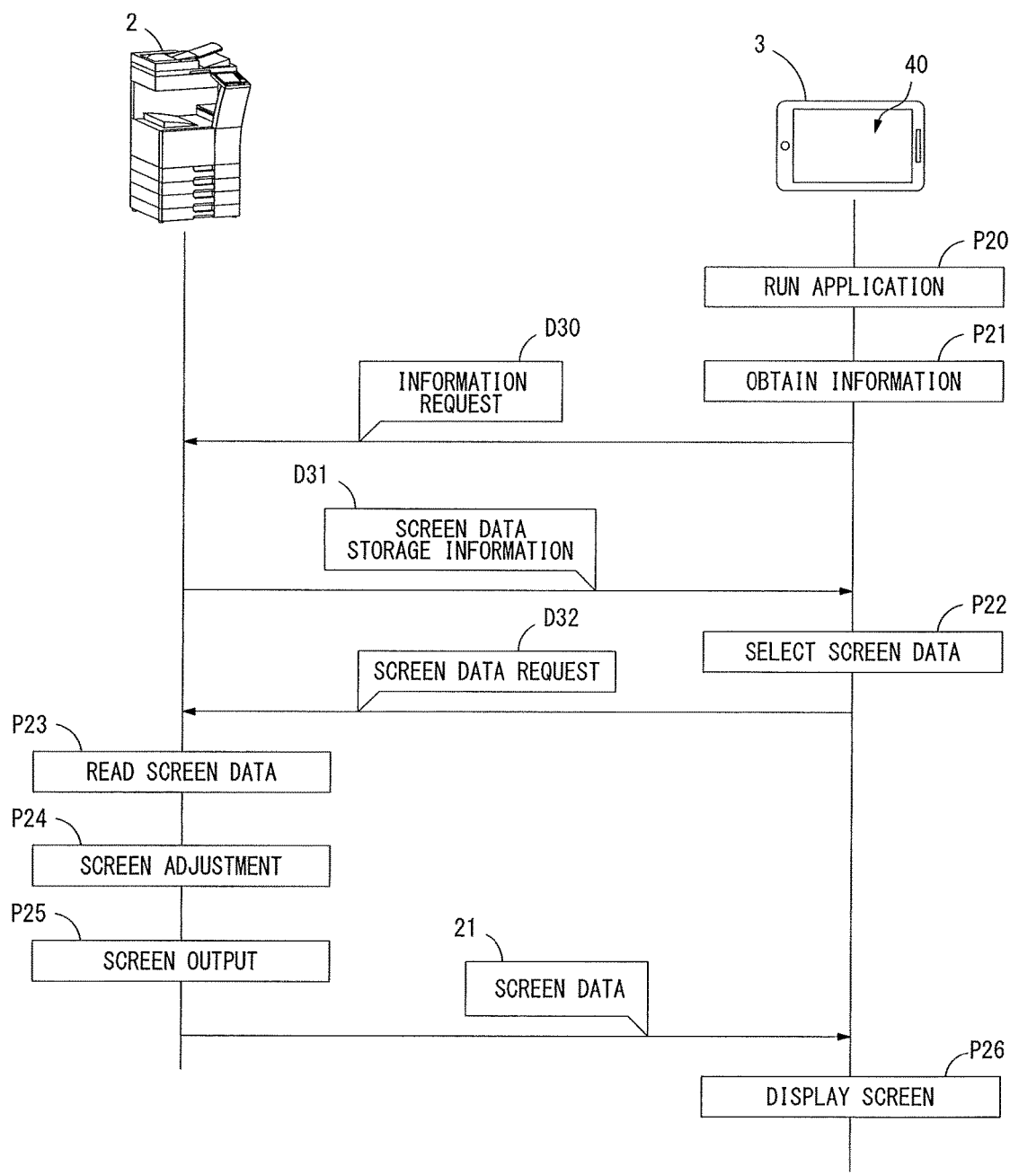
FIG. 12 shows an example of the operation process worked together by the image processing device and the terminal device of a second preferred embodiment.

FIG. 12 shows an example of the operation process worked together by the image processing device 2 and the terminal device 3 of the second preferred embodiment. The terminal device 3 executes the application program 49 in response to the user operation at first, and runs the application 50 (process P20). After running the application 50, the terminal device 3 performs the process to obtain the information relating to the multiple types of the screen data 21 in the image processing device 2 (process P21). Thus, an information request D30 is sent to the image processing device 2 from the terminal device 3. After receiving the information request D30, the image processing device 2 sends screen data storage information D31 that is information relating to the multiple types of the screen data 21 in the storage 15 to the terminal device 3. The screen data storage information D31 contains information such as the screen size or the resolution relating to each of the multiple types of the screen data 21. After receiving the screen data storage information D31 from the image processing device 2, the terminal device 3 refers the screen size of each of the multiple types of the screen data 21 and performs the screen data selecting process to select one of the multiple types of the screen data 21 (process P22). To be more specific, if there is the screen data corresponding to the screen size the same as that of the display unit 40 in the multiple types of the screen data 21 in the image processing device 2, the terminal device 3 selects the screen data. If there is no screen data corresponding to the screen size the same as that of the display unit 40 in the multiple types of the screen data 21 in the image processing device 2, the terminal device 3 selects the screen data corresponding to the screen size smaller than that of the display unit 40 in the multiple types of the screen data 21 in the image processing device 2. The terminal device 3 then sends a screen data request D32 requesting the transmission of the screen data 21 selected in process P22 to the image processing device 2. The screen data request D32 contains information relating to the resolution of the display unit 40 provided with the terminal device 3, for example.

After receiving the screen data request D32 from the terminal device 3, the image processing device 2 reads the screen data 21 specified with the screen data request D32 from the storage 15 (process P23). The image processing device 2 performs the screen adjustment to adjust the screen data 21 read from the storage 15 as required (process P24). In the screen adjustment, the resolution conversion by the resolution converting part 34 and/or the content adjustment by the content adjusting part 35 is performed as well as the first preferred embodiment. The image processing device 2 outputs the screen data (process P25). Thorough this process, one of the multiple types of the screen data 21 is sent to the terminal device 3 from the image processing device 2. The screen data 21 thereby sent is the screen data 21 selected in the process P22 and is the processed screen data 21 when the screen adjustment in the process P24 is performed.

In response to receiving the screen data 21 from the image processing device 2, the terminal device 3 displays the screen based on the received screen data 21 on the display unit 40 (process P26). As well as the first preferred embodiment, after detecting the user operation, the terminal device 3 generates the operation information based on the user operation, and sends the generated operation information to the image processing device 2 which is not shown in FIG. 12. As a result, the screen on the display unit 40 may be updated and the job may be executed at the image processing device 2.

Figure 13:
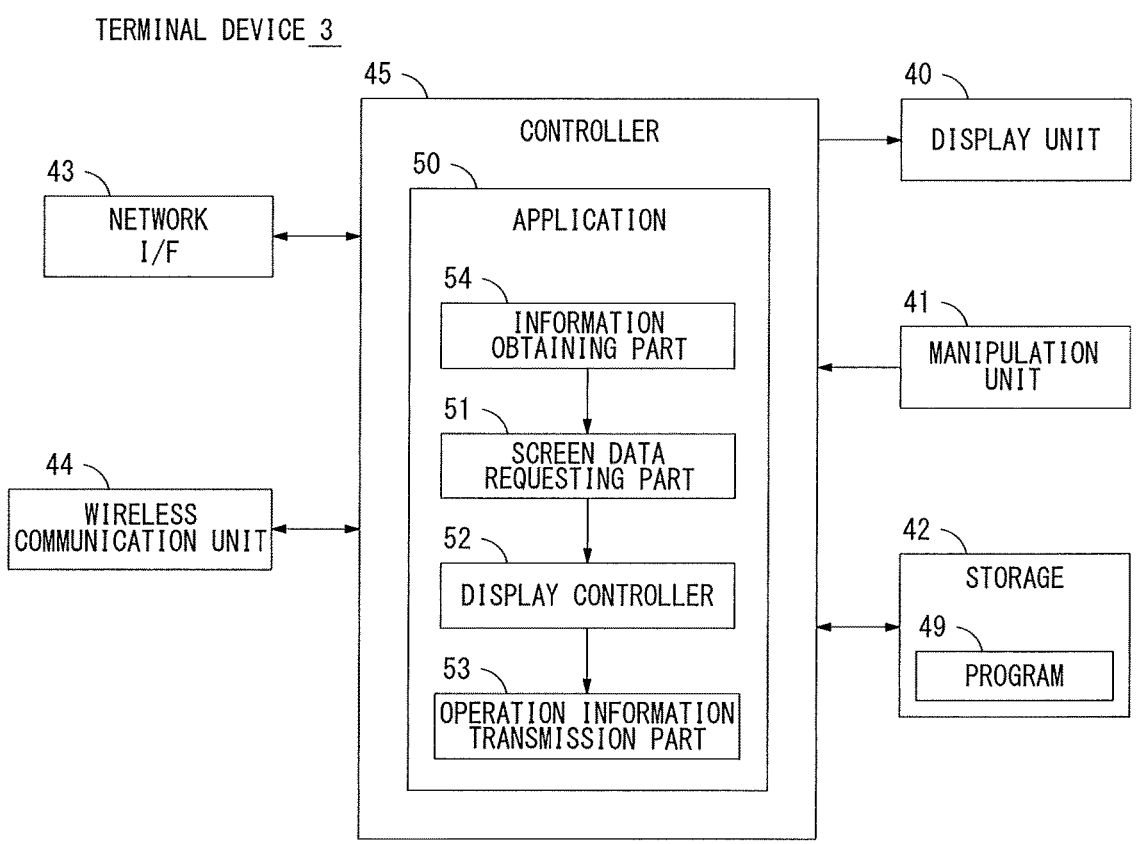
FIG. 13 is a block diagram showing an example of a hardware structure and that of a functional structure of the terminal device of the second preferred embodiment.

FIG. 13 is a block diagram showing an example of a hardware structure and that of a functional structure of the terminal device 3 of the second preferred embodiment. The terminal device 3 of the second preferred embodiment has the same hardware structure as that of the first preferred embodiment. The application 50 run on the controller 45 includes an information obtaining part 54, the screen data requesting part 51, the display controller 52 and the operation information transmission part 53. The information obtaining part 54 becomes operative when the application 50 is started running. The information obtaining part 54 obtains the screen data storage information D31 from the image processing device 2. To be more specific, the information obtaining part 54 sends the information request D30 to the image processing device 2, thereby obtaining the screen data storage information D31 from the image processing device 2. After the screen data storage information D31 is obtained, the application 50 brings the screen data requesting part 51 into operation.

The screen data requesting part 51 of the second preferred embodiment selects one of the multiple types of the screen data 21 stored in the image processing device 2 based on the screen data storage information D31 obtained by the information obtaining part 54, and sends the screen data request D32 to the image processing device 2 with specifying the selected screen data 21. If there is the screen data corresponding to the screen size the same as that of the display unit 40 in the multiple types of the screen data 21 in the image processing device 2, the screen data requesting part 51 selects the screen data 21 corresponding to the same screen size as described above. If there is no screen data corresponding to the screen size the same as that of the display unit 40 in the multiple types of the screen data 21 in the image processing device 2, the screen data requesting part 51 selects the screen data corresponding to the screen size smaller than that of the display unit 40 in the multiple types of the screen data 21 in the image processing device 2. If there is more than one type of the screen data 21 corresponding to the screen size smaller than that of the display unit 40, the screen data requesting part 51 selects one of the more than one type of the screen data 21 corresponding to the biggest screen size in the more than one type of the screen data 21. If there is no screen data corresponding to the screen size smaller than that of the display unit 40 in the multiple types of the screen data 21 in the image processing device 2, the screen data requesting part 51 selects the screen data corresponding to the smallest screen size in the multiple types of the screen data 21 in the image processing device 2. The screen data requesting part 51 then sends the screen data request D32.

The display controller 52 and the operation information transmission part 53 are the same as those described in the first preferred embodiment.

FIG. 14 is a flow diagram explaining an exemplary sequential procedure of the process performed at the terminal device 3 of the second preferred embodiment. This process is performed when the application 50 is started up. Upon start of the process, the terminal device 3 obtains the information about the screen size of the display unit 40 (step S40), then sends the information request D30 containing the information about the screen size to the image processing device 2 (step S41). The terminal device 3 waits until receiving the screen data storage information D31 from the image processing device 2 (step S42). After receiving the screen data storage information D31 (when a result of step S42 is YES), the terminal device 3 selects one of the multiple types of the screen data 21 in the image processing device 2 (step S43). To be more specific, the screen data 21 corresponding to the screen size smaller than that of the display unit 40 is selected if there is no screen data 21 corresponding to the screen size the same as that of the display unit 40 in step S43.

The terminal device 3 obtains the resolution of the display unit 40 (step S44), and sends the screen data request D32 that contains the information relating to the resolution and the information relating to the screen data 21 selected in step S43 to the image processing device 2 (step S45). The terminal device 3 waits until receiving the screen data 21 from the image processing device 2 (step S46). After receiving the screen data 21 (when a result of step S46 is YES), the terminal device 3 displays the screen based on the screen data 21 on the display unit 40 (step S47).

As described above, on the image processing system 1 of the second preferred embodiment, the terminal device 3 obtains the screen data storage information D31 relating to the multiple types of the screen data 21 from the image processing device 2. The terminal device 3 selects the screen data corresponding to the screen size smaller than that of the display unit 40 from among the multiple types of the screen data 21 stored in the image processing device 2 based on the screen data storage information D31, and requests for the screen data to the image processing device 2. As described above, it is not necessary for the image processing device 2 of the second preferred embodiment to select the screen data 21 from among the multiple types of the screen data 21, resulting in the reduction of the process burden on the image processing device 2. Even when the image processing device 2 starts the communication with the terminal device 3 during the execution of the job, the image processing device 2 is allowed to send appropriate screen data 21 to the terminal device 3 without having a decrease in the job execution efficiency.

Everything else except for the points described above in the second preferred embodiment is the same as that explained in the first preferred embodiment.

MODIFICATIONS

While the preferred embodiments of the present invention have been described above, the present invention is not limited to the preferred embodiments. Various modifications may be applied to the present invention.

According to the above-described first and second preferred embodiments, when the image processing device 2 enables the terminal device 3 to display the screen on the display unit 40, the above-described process is performed. However, this is given not for limitation. The process explained in the above-described first and second preferred embodiments may be applied when the image processing device 2 displays the screen on the display unit 11 of the operational panel 10. As described above, the destination of the output of the screen data 21 selected by the image processing device 2 from among the multiple types of the screen data 21 is not necessary the terminal device 3. The destination of the output may be the display unit 11 of the operational panel 10.

According to the above-described first and second preferred embodiments, the image processing device 2 is shown to be the MFP provided with the multiple functions including the copy function, the scan function, the print function and the fax function. However, this is given not for limitation. To be more specific, the image processing device 2 may be a device that is provided with at least one of the multiple functions including the copy function, the scan function, the print function and the fax function and configures the settings about the job and/or executes the job in response to the user operation.

What is claimed is:

1. An image processing system comprising:
a terminal device that is provided with a display; and
an image processing device that outputs screen data to said terminal device, thereby enabling said display to display an operation screen based on the screen data, wherein
said image processing device includes:
a storage in which multiple types of the screen data corresponding to respective screen sizes are stored; and
a hardware processor configured to:
obtain information relating to the screen size and resolution of said display;
select the screen data corresponding to the largest screen size smaller than the screen size of said display from among said multiple types of the screen data based on the information that is obtained;
compare resolution of content included in the selected screen data to the resolution of the display;
when the content included in the selected screen data has a resolution higher than the resolution of said display, generate content for display by enlarging or reducing the content included in the selected screen data, thereby adjusting a size of the generated content for display based on a size of the display and generating the screen data for output; and
output the screen data that is selected to said terminal device.

2. The image processing system according to claim 1, wherein said hardware processor is further configured to:
enlarge or reduce the content included in the screen data one by one, thereby adjusting a display size of the content displayed on said display to be a predetermined size when the screen data corresponding to the screen size smaller than the screen size of the display is selected.

3. The image processing system according to claim 1, wherein
said terminal device further includes a hardware processor configured to generate operation information based on a user operation and send said generated operation information to said image processing device as the screen based on the screen data received from said image processing device is being displayed on said display,
said hardware processor of said image processing device is further configured to: record and analyze said operation information, thereby detecting an increase of a frequency of a predetermined user operation or the increase of a user operation time, and
change the screen data to select as a target of output to said terminal device when said hardware processor of said image processing device detects the increase of the frequency of the predetermined user operation or the increase of the user operation time.

4. An image processing device that outputs screen data to a display, thereby enabling said display to display an operation screen based on the screen data, comprising:
a storage in which multiple types of the screen data corresponding to respective screen sizes are stored; and
a hardware processor configured to:
obtain information relating to the screen size and resolution of said display;
select the screen data corresponding to the largest screen size smaller than the screen size of said display from among said multiple types of the screen data based on the information that is obtained;
compare resolution of content included in the selected screen data to the resolution of the display;
when the content included in the selected screen data has a resolution higher than the resolution of said display, generate content for display by enlarging or reducing the content included in the selected screen data, thereby adjusting a size of the generated content for display based on a size of the display and generating the screen data for output; and
output the screen data that is selected to said display.

5. The image processing device according to claim 4, wherein said hardware processor is further configured to:
enlarge or reduce a content included in the screen data one by one, thereby adjusting a display size of the content displayed on said display to be a predetermined size when the screen data corresponding to the screen size smaller than the screen size of the display is selected.

6. The image processing device according to claim 4, wherein said hardware processor is further configured to:
obtain operation information based on a user operation as the screen based on the screen data that is received is being displayed on said display;
record and analyze said operation information, thereby detecting an increase of a frequency of a predetermined user operation or the increase of a user operation time, wherein
change the screen data to select as a target of output to said display when said hardware processor detects the increase of the frequency of the predetermined user operation or the increase of the user operation time.

7. The image processing device according to claim 4, wherein
said display is provided with a terminal device capable of communicating with said image processing device.

8. A non-transitory computer readable recording medium storing a program to be executed by an image processing device capable of managing multiple types of screen data corresponding to respective screen sizes, said program executed on said image processing device to make the image processing device:
obtain information relating to the screen size and resolution of a display which is a target of an output of the screen data;
select the screen data corresponding to the largest screen size smaller than the screen size of said display from among said multiple types of the screen data based on the information that is obtained;
compare resolution of content included in the selected screen data to the resolution of the display;
when the content included in the selected screen data has a resolution higher than the resolution of said display, generate the content for display by enlarging or reducing the content included in the selected screen data, thereby adjusting a size of the generated content for display based on a size of the display and generating the screen data for output; and output an operation screen that includes data selected for said display.

9. The non-transitory computer readable recording medium according to claim 8, said program further makes said image processing:

enlarge or reduce a content included in the screen data one by one, thereby adjusting a display size of the content displayed on said display to be a predetermined size when the screen data corresponding to the screen size smaller than the screen size of the display is selected.

* * * * *